US011873989B2

(12) United States Patent
Vissenberg et al.

(10) Patent No.: US 11,873,989 B2
(45) Date of Patent: Jan. 16, 2024

(54) ARTIFICIAL SKYLIGHT DEVICE

(71) Applicant: SIGNIFY HOLDING B.V., Eindhoven (NL)

(72) Inventors: Michel Cornelis Josephus Marie Vissenberg, Roermond (NL); Bartel Marinus Van De Sluis, Eindhoven (NL); Leendert Teunis Rozendaal, Valkenswaard (NL); Marcellinus Petrus Carolus Michael Krijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/912,515

(22) PCT Filed: Mar. 11, 2021

(86) PCT No.: PCT/EP2021/056189
§ 371 (c)(1),
(2) Date: Sep. 18, 2022

(87) PCT Pub. No.: WO2021/185670
PCT Pub. Date: Sep. 23, 2021

(65) Prior Publication Data

US 2023/0137309 A1 May 4, 2023

(30) Foreign Application Priority Data

Mar. 17, 2020 (EP) .................................... 20163654

(51) Int. Cl.
*F21V 7/00* (2006.01)
*F21S 8/02* (2006.01)
(Continued)

(52) U.S. Cl.
CPC ............ *F21V 7/0083* (2013.01); *F21S 8/026* (2013.01); *F21V 14/006* (2013.01); *F21Y 2115/10* (2016.08)

(58) Field of Classification Search
CPC ...... F21V 7/0083; F21V 14/006; F21V 3/049; F21V 9/02; F21S 8/026; F21Y 2115/10
See application file for complete search history.

(56) References Cited

U.S. PATENT DOCUMENTS 9,488,327 B2 11/2016 Van Gheluwe et al.
9,784,418 B2 10/2017 Van Bommel et al.
(Continued)

FOREIGN PATENT DOCUMENTS

DE 102011112285 A1 3/2013
JP S5812206 A 1/1983
JP 2019129082 A 8/2019

*Primary Examiner* — Peggy A Neils

(57) ABSTRACT

A lighting device (1) is provided. The lighting device (1) comprises a cavity (10). The cavity (10) is extending along a longitudinal axis (L) of the lighting device (1). Further, the cavity (10) is defined by an interior surface (11) configured to reflect light impinging upon the interior surface (11) of the cavity (10). The cavity (10) has an opening (12) permitting light inside the cavity (10) to exit the cavity (10). The lighting device (1) further comprises an optical module (20). The optical module (20) is arranged in or at the opening (12) of the cavity (10), and is configured to transmit light impinging upon a surface (21) of the optical module (20) through the optical module (20). The light transmitted through the optical module (20) is emitted from the lighting device (1). The lighting device (1) further comprises a plurality of light emitting elements (31). The light emitting elements (31) are arranged in a succession along the longitudinal axis (L) of the lighting device (1) and arranged in the cavity (10), and are configured to emit first light (41). The first light (41) is impinging on the surface (21) of the optical module (20) without having first impinged on the interior
(Continued)

surface (11) of the cavity (10). The light emitting elements (31) are further configured to emit second light (42). The second light (42) is impinging on the interior surface (11) of the cavity (10). The optical module (20) is configured to collimate the first light (41) in a transverse plane. The transverse plane is perpendicular to the longitudinal axis (L) of the lighting device (1). The optical module (20) is further configured to produce collimated light so as to increase the degree of collimation of light, in the transverse plane, transmitted from the optical module (20) as compared to the first light (41) prior to transmission through the optical module. At least one of the interior surface (11) of the cavity (10), the plurality of light-emitting elements (31) and the optical module (20) is or are configured such that the second light (42), reflected by the interior surface (11) of the cavity (10) and subsequently having impinged upon the surface (21) of the optical module (20) and transmitted from the optical module (20), is light for which at least 3% of the total luminous flux is in the wavelength range 400-470 nm.

13 Claims, 3 Drawing Sheets

(51) Int. Cl.
*F21V 14/00* (2018.01)
*F21Y 115/10* (2016.01)

(56) References Cited

U.S. PATENT DOCUMENTS

| | | | |
|---|---|---|---|
| 9,791,131 | B2 | 10/2017 | Onac et al. |
| 10,182,483 | B2 * | 1/2019 | Takeshita .............. F21V 7/0008 |
| 2014/0133125 | A1 | 5/2014 | Di Trapani et al. |
| 2017/0074486 | A1 | 3/2017 | Flynn et al. |
| 2018/0202629 | A1 | 7/2018 | Takeshita |
| 2018/0252374 | A1 | 9/2018 | Keller et al. |
| 2018/0275501 | A1 | 9/2018 | Takeshita et al. |
| 2018/0320376 | A1 * | 11/2018 | Di Trapani ............. F21V 7/005 |
| 2019/0178471 | A1 | 6/2019 | Di Trapani |

* cited by examiner

ARTIFICIAL SKYLIGHT DEVICE

CROSS-REFERENCE TO PRIOR APPLICATIONS

This application is the U.S. National Phase application under 35 U.S.C. § 371 of International Application No. PCT/EP2021/056189, filed on Mar. 11, 2021, which claims the benefit of European Patent Application No. 20163654.5, filed on Mar. 17, 2020. These applications are hereby incorporated by reference herein.

TECHNICAL FIELD

The present invention is related to a lighting device for obtaining an artificial skylight/daylight or a natural window appearance.

BACKGROUND

There is an interest to people for receiving daylight, due to it being important for their health and well-being. However, people tend to spend a majority of their day indoors, which may remove them from natural daylight. Therefore, there is an interest in creating artificial light, which may simulate the appearance and light of a natural window or skylight. In order to emulate daylight and skylight more faithfully, one has to emulate sunlight. This has mainly been done by providing an artificial daylight or skylight which emits blue light (i.e. clear sky) when viewed from an angle, while still providing a predominantly white light beam directed substantially perpendicular to the exit window of the daylight or skylight. An example of a lighting system that simulates natural lighting is shown in US2014133125. The shown lighting system comprises a bright light hidden in a space above a false ceiling, wherein the light emits a directional beam of light which shines through an exit window that contains scattering nanoparticles. A drawback with such a system is that the light source must be much smaller than the exit window in order to create a sharply defined beam of artificial sunlight, but at the same time the source must produce a very high flux in order to create a convincing sunlight beam effect. Thus, a very compact and extremely bright light source is needed, which is very costly.

SUMMARY

In view of the above discussion, a concern of the present invention is to provide a lighting device which can deliver a convincing sunlight beam effect, without the use of a very compact and extremely bright light source. It is further a concern of the present invention to provide a lighting device which can imitate a skylight or a natural window whilst providing a compact installation, and/or which may entail reduced requirement of a false ceiling/wall.

To address at least one of these concerns and other concerns, a lighting device in accordance with the independent claim is provided. Preferred embodiments are defined by the dependent claims.

According to a first aspect of the present invention, a lighting device is provided. The lighting device has a length, a width, and a longitudinal axis. The longitudinal axis is an axis that is oriented along the length of the lighting device. An aspect ratio of the length and width (i.e. the length divided by the width) is at least 2, such as at least 5, or at least 10, or at least 50, or at least 100. Because of the aspect ratio, the lighting device may also be referred to as a "linear" lighting device.

The lighting device may comprise a cavity. The cavity may extend along a longitudinal axis of the lighting device. Further, the cavity may be defined by an interior surface configured to reflect light impinging upon the interior surface of the cavity and have an opening permitting light inside the cavity to exit the cavity. The lighting device may further comprise an optical module. The optical module may be arranged in or at the opening of the cavity. The optical module may be configured to transmit light impinging upon a surface of the optical module through the optical module. The light transmitted through the optical module may be emitted from the lighting device. The lighting device may comprise a plurality of light emitting elements arranged in a succession along the longitudinal axis of the lighting device and arranged in the cavity. The plurality of light emitting elements may be configured to emit first light, impinging on the surface of the optical module without having first impinged on the interior surface of the cavity, and second light, impinging on the interior surface of the cavity. The optical module may be configured to collimate the first light, in a transverse plane, the transverse plane being perpendicular to the longitudinal axis of the lighting device. The optical module may be configured to produce collimated light, in the transverse plane, so as to increase the degree of collimation of light transmitted from the optical module as compared to the first light prior to transmission through the optical module. At least one of the interior surface of the cavity, the plurality of light-emitting elements and the optical module may be configured such that the second light, reflected by the interior surface of the cavity and subsequently having impinged upon the surface of the optical module and transmitted from the optical module, is light for which at least 3% of the total luminous flux is in the wavelength range 400-470 nm.

The lighting device may comprise a luminaire. By the term "luminaire", it is meant a fixture, a light-fitting, or a light armature, for example. The luminaire may comprise the interior surface. The opening of the cavity may extend along the longitudinal axis of the lighting device. The optical module may be arranged in or at the opening of the cavity, such that light inside the cavity has to be transmitted by the optical module to exit the cavity. By the term "light emitting elements", it is meant as comprising light emitting diodes (LEDs), a plurality of LEDs, and/or a plurality of LEDs arranged in a linear array. Further, by the term "light emitting elements" it is meant a dense packing of LEDs. The dense packing of LEDs may be along the longitudinal axis of the lighting device. Each or any of the LEDs may comprise inorganic LED(s) and/or organic LED(s) (OLEDs). While reference is made herein to the light emitting elements as comprising LEDs, it is to be understood that each or any of the light emitting elements, in alternative or in addition to a LED, could comprise another or other types of light sources, such as another or other types of solid state light emitters. The light emitting elements may be arranged along substantially the entire longitudinal length of the cavity of the lighting device. By the terms "collimated light" and "collimation", it is in the context of the present application meant to make part of the light rays mutually parallel and/or reduce mutually angles between part of the light rays. Increasing the degree of collimation may mean narrowing the beam of light. Warm white light has about 1% of light in the wavelength range 400-470 nm (or less), whereas cool white light has about 2-3% of blue light in it (about 3% at the correlated color temperature 6500 K, which may be considered as "daylight"). Light for which at least 3% of the total luminous flux is in the wavelength range 400-470 nm may represent sky colors (bluish white to blue tints). Thus, light for which at least 3% of the total luminous flux is in the wavelength range 400-470 nm may appear to be blue to a viewer looking at the lighting device from a distance. By the term "white light", it is meant light which is a mixture of substantially all of the wavelengths of the visible spectrum.

At least one of the plurality of light emitting elements may be arranged such that the second light emitted by the plurality of light emitting elements is light for which at least 3% of the total luminous flux is in the wavelength range 400-470 nm. Light for which at least 3% of the total luminous flux is in the wavelength range 400-470 nm may represent a blue sky or clouds, which could be described as white light with a correlated color temperature (CCT) from about 10000 K up to 20000 K (about 3.8%-4.6% of blue flux).

Thereby, the degree of similarity of light emitted by the lighting device to that of a natural window or skylight may be increased. At least one of the plurality of light emitting elements may be configured to emit light for which at least 3% of the total luminous flux is in the wavelength range 400-470 nm. The plurality of light emitting elements which are not configured to emit light for which at least 3% of the total luminous flux is in the wavelength range 400-470 nm, may be configured to emit light for which less than 3% of the total luminous flux is in the wavelength range between 400-470 nm, or white light.

The plurality of light-emitting elements may be configured such that the second light, reflected by the interior surface of the cavity and subsequently having impinged upon the surface of the optical module and transmitted through the optical module, is light for which at least 3% of the total luminous flux is in the wavelength range 400-470 nm, by the at least one of the plurality of light emitting elements being arranged such that the second light emitted by the plurality of light emitting elements is light for which at least 3% of the total luminous flux is in the wavelength range 400-470 nm.

At least one of the plurality of light emitting elements may be arranged such that the first light emitted by the plurality of light emitting elements is light for which less than 3% of the total luminous flux is in the wavelength range between 400-470 nm, or white light. Light for which less than 3% of the total luminous flux is in the wavelength range 400-470 nm may represent direct sunlight, which has a CCT of about 3000-5500 K, i.e. about 1-2.5% of blue light.

Thereby, the degree of similarity of light emitted by the lighting device to a natural window or skylight and to that of a beam of sunlight may be increased. At least one of the plurality of light emitting elements may be configured to emit light for which less than 3% of the total luminous flux is in the wavelength range between 400-470 nm, or white light. The plurality of light emitting elements which are not configured to emit light for which less than 3% of the total luminous flux is in the wavelength range between 400-470 nm, or white light, may be configured to emit light for which at least 3% of the total luminous flux is in the wavelength range 400-470 nm.

The interior surface of the cavity may have a reflectivity above 80% for light within the wavelength range 400-470 nm and a reflectivity less than 80% for light at other wavelengths.

Thereby, the degree of similarity of the lighting device to that of a natural light or skylight may be increased. The interior surface may be configured to absorb substantially all light which is outside of the wavelength range of 400-470 nm.

The interior surface of the cavity may be configured such that the second light, reflected by the interior surface of the cavity and subsequently having impinged upon the surface of the optical module and transmitted through the optical module, is light for which at least 3% of the total luminous flux is in the wavelength range 400-470 nm, by the interior surface of the cavity having a reflectivity above 80% for light within the wavelength range 400-470 nm and a reflectivity less than 80% for light at other wavelengths. Thereby, light with less than 3% of 'blue' light may have more than 3% of blue light after reflection off the interior surface of the cavity.

However, the present inventive concept is not limited to abovementioned reflectivity, and the interior surface of the cavity may for example have a reflectivity above 70% for light within the wavelength range 400-470 nm and a reflectivity less than 70% for light at other wavelengths.

The interior surface of the cavity may for example comprise paint. The paint may be configured to scatter and/or reflect light in the wavelength range 400-470 nm and to absorb light outside the wavelength range 400-470 nm. The interior surface of the cavity may comprise scattering nanoparticles. The interior surface of the cavity may be configured for Rayleigh scattering. The scattering nanoparticles may be configured for Rayleigh scattering. The nanoparticles may be configured to scatter and/or reflect light in the wavelength range 400-470 nm and to absorb light outside the wavelength range 400-470 nm.

The optical module may comprise a linear collimator configured to collimate at least the first light, in the transverse plane. The linear collimator may be configured to produce collimated light so as to increase the degree of collimation of light, in the transverse plane, transmitted from the optical module as compared to the first light prior to transmission through the optical module.

Thereby, the appearance of the first light may have an increased degree of similarity to that of a beam of sunlight. The linear collimator may be configured to only collimate the first light. The linear collimator may be configured to produce collimated light so as to increase the degree of collimation of first light transmitted from the optical module as compared to the first light prior to transmission through the optical module.

The plurality of light emitting elements and/or the interior surface of the cavity may be configured such that substantially only the first light impinges upon the linear collimator of the optical module. In other words, the plurality of light emitting elements and/or the interior surface of the cavity may be configured such that substantially none of the second light impinges upon the linear collimator of the optical module. The optical module may comprise a plurality of linear collimators. At least one of the plurality of linear collimators may be configured to collimate at least the first light.

The linear collimator may for example be constituted by or comprise a linear lens.

Therefore, the appearance of the first light may have a further increased degree of similarity to that of a beam of sunlight. The optical module may comprise a diffuser. The diffuser may be configured to diffuse the appearance of the linear collimator for a viewer looking at the lighting device from a distance. Further, the diffuser may be configured to substantially only diffuse the appearance of the linear collimator for a viewer looking at the lighting device from a distance. The linear collimator may be arranged between the light emitting elements and the diffuser. The linear collimator may be constituted by or comprise a reflector, a lens, an optical element based on total internal reflection (TIR), and/or a diffractive element. The linear collimator may be configured as a linear refractive lens. The linear collimator may be a linear Fresnel lens. The linear Fresnel lens may comprise refractive segments. However, the linear Fresnel lens may comprise refractive segments and TIR-segments.

The lighting device may further comprise a plurality of light emitting elements arranged in a succession along the longitudinal axis of the lighting device and arranged in the cavity. The further comprised plurality of light emitting elements may be configured to emit third light, impinging on the surface of the optical module without having first impinged on the interior surface of the cavity. The optical module may be further configured to collimate the third light, in the transverse plane, and produce collimated light so as to increase the degree of collimation of light, in the transverse plane, transmitted from the optical module as compared to the third light prior to transmission through the optical module. At least one of the optical module and the plurality of light emitting elements configured to emit third light may be configured such that the third light transmitted from the optical module has a direction different from the direction of the first light transmitted by the optical module.

Hence, a lighting device configured to emit a third light may increase the degree of similarity of the lighting device to that of a natural window or skylight. The optical module may comprise a lens configured to collimate at least the first light and another lens configured to collimate at least the third light. In other words, the optical module may comprise a lens configured to substantially only collimate the first light and another lens configured to substantially only collimate the third light. The different plurality of light emitting elements may be arranged differently in the cavity, such that each plurality of light emitting elements may emit light with characteristics different from light emitted by other plurality of light emitting elements, wherein the characteristics may comprise the color of the light, the direction of the light, the intensity of the light, and/or the degree of collimation of the light.

The lighting device may further comprise a control unit. The control unit may be coupled to and configured to selectively switch on or switch off the plurality of light emitting elements configured to emit first light and the plurality of light emitting elements configured to emit third light, respectively.

Hence, the degree of control of the light emitted by the lighting device may be increased. An increase of degree of control of the light emitted by the lighting device may increase the degree of similarity of the lighting device to that of a natural window or skylight. The control unit may be configured to control the direction of the light emitted by the lighting device. The direction of the light emitted by the lighting device may be controlled by the control unit by selectively switching on or switching off the plurality of light emitting elements. Each plurality of light emitting elements may emit light with a direction. The control unit may be further configured to control the direction of the light emitted by the lighting device, such that the direction of the light emitted by the lighting device is substantially the same direction as the direction of the sun with regards to the optical module. At least one of the plurality of the light emitting elements configured to emit first light and the plurality of light emitting elements configured to emit third light may be configured to emit second light. The control unit may be configured to selectively switch on or switch of the at least one of the plurality of the light emitting elements configured to emit first light and the plurality of light emitting elements configured to emit third light configured to emit second light. Thereby, the control unit may be configured to control the first and/or the third light with regards to the second light. Further, at least one other of the plurality of the light emitting elements configured to emit second light may be configured such that the second light, reflected by the interior surface of the cavity and subsequently having impinged upon the surface of the optical module and transmitted from the optical module, is white light.

The cavity may have a rectangular shape or a curved shape. This may mean that a cross section of the cavity—e.g., a cross section in a plane perpendicular to the longitudinal axis—may have a rectangular shape, or a curved shape.

Thereby, the second light, reflected by the interior surface of the cavity may be controlled by the shape of the cavity. Controlling the second light may increase the degree of similarity of light emitted by the lighting device to that of a natural window or skylight. Further, it may increase the intensity of the light emitted by the lighting device. A cross-section, along the longitudinal axis of the lighting device, of the cavity may have a rectangular shape or a curved shape. The present inventive concept is not limited by the shape being rectangular or curved, and the shape may have substantially any geometrical shape.

The interior surface may comprise a first interior surface and a second interior surface. The first interior surface may be configured such that the second light, reflected by the first interior surface of the cavity and subsequently having impinged upon the surface of the optical module and transmitted through the optical module, is light for which at least 3% of the total luminous flux is in the wavelength range between 400-470 nm. The second interior surface may be configured such that the second light, reflected by the second interior surface of the cavity and subsequently having impinged upon the surface of the optical module and transmitted through the optical module, is light for which a percentage of the total luminous flux in the wavelength range 400-470 nm is higher than the percentage of the total luminous flux in the wavelength range 400-470 nm of the second light reflected by the first interior surface. The second interior surface of the cavity may have at least one of a reflectivity for light in the wavelength range 400-470 nm which is higher than a reflectivity for light in the wavelength range 400-470 nm of the first interior surface, and a reflectivity for light in the wavelength range 470-650 nm which is lower than a reflectivity for light in the wavelength range 470-650 nm of the first interior surface.

Hence, the degree of similarity of light emitted by the lighting device to that of a natural window or skylight may be increased, especially with regards to the appearance of the lighting device as seen by a viewer looking directly at the lighting device. The first interior surface may be configured to resemble clouds, as seen by a viewer looking at the lighting device from a distance. The second interior surface may be configured to resemble a blue sky, as viewed by a viewer looking at the lighting device from a distance. The interior surface may comprise a plurality of first interior surfaces. Additionally, the interior surface may comprise a plurality of second interior surfaces. The first interior surface(s) and the second interior surface(s) may be configured to create the appearance of a cloudy sky, as viewed by a viewer looking at the lighting device from a distance. The first interior surface of the cavity may for example comprise a first paint. The first paint may be configured to reflect white light and/or blue light. The first paint may for example comprise white paint, blue paint or a blend of white paint and blue paint. The second interior surface of the cavity may for example comprise a second paint. The second paint may be configured to reflect blue light. The second paint may comprise blue paint. The second paint may be configured to reflect more blue light than the first paint. The first interior surface of the cavity may comprise scattering nanoparticles, configured to scatter and/or reflect white light. The second interior surface of the cavity may comprise scattering nanoparticles, configured to scatter and/or reflect blue light and to absorb light of colors other than blue.

The interior surface may comprise a passive reflective display device. Thereby, the second light may impinge on a surface of the passive reflective display device display. The surface of the passive reflective display device display may comprise a plurality of passive reflective display device sections. The lighting device may further comprise a control unit. The control unit may be coupled to the passive reflective display device, and may be configured to supply a voltage to each passive reflective display device section. A passive reflective display device section may be in a first state, if a first voltage is applied to the passive reflective display device section by the control unit. A passive reflective display device section may be in a second state, if a second voltage is applied to the passive reflective display device section by the control unit. The first voltage may be different from the second voltage. A passive reflective display device section in the first state may be configured such that the second light, reflected by the passive reflective display device section in the first state and subsequently having impinged upon the surface of the optical module and transmitted through the optical module, is light for which at least 3% of the total luminous flux is in the wavelength range between 400-470 nm. A passive reflective display device section in the second state may be configured such that the second light, reflected by the passive reflective display device section in the second state and subsequently having impinged upon the surface of the optical module and transmitted through the optical module, is light for which a percentage of the total luminous flux is in the wavelength range 400-470 nm is higher than the percentage of the total luminous flux in the wavelength range 400-470 nm of the second light reflected by the passive reflective display device section in the first state, by the passive reflective display device section in the second state having at least one of a reflectivity for light in the wavelength range 400-470 nm which is higher than a reflectivity for light in the wavelength range 400-470 nm of the passive reflective display device section in the first state, and a reflectivity for light in the wavelength range 470-650 nm, which is lower than a reflectivity for light in the wavelength range 470-650 nm of the passive reflective display device section in the first state.

The passive reflective display device may for example be constituted by or comprise, but is not limited to, one or more electronic ink (e-ink) displays. By the term "electronic ink display", it is meant electronic paper, e-paper, electrophoretic display, e-ink, electrowetting display, or electrofluidic display.

The lighting device may further comprise a light-transmissive layer. The light-transmissive layer may be arranged within the cavity at a distance from the interior surface such that the light-transmissive layer and the interior surface encloses a space for accommodating fluid. A first fluid and a second fluid may be arranged within the space. The first fluid and the second fluid may have different optical properties with regard to at least one or more of reflectance, absorbance, transmittance or scattering of light impinging on the first fluid and the second fluid, respectively. The light-transmissive layer may be arranged such that the second light is impinging on at least one of the first fluid and the second fluid.

The first fluid may be configured to transmit light impinging upon the first fluid. The second fluid may be configured to reflect white light impinging on the second fluid.

The first fluid may be configured to reflect blue light impinging on the second fluid, and the second fluid may be configured to transmit light impinging on the second fluid, and the interior surface of the cavity may be configured to reflect white light.

The second fluid may be configured to absorb red light and green light and to transmit blue light, and the interior surface of the cavity may be configured to reflect light. Thereby, light impinging upon the light-transmissive layer may be transmitted by the first fluid or the second fluid.

Further, the first fluid may be configured to reflect blue light impinging on the first fluid, and the second fluid may be configured to reflect white light impinging on the second fluid. Thereby, substantially all light impinging upon the light-transmissive layer ay be reflected by the first fluid or the second fluid. The arrangement of the light-transmissive layer, first fluid, and second fluid may be understood as a reflective layer.

Therefore, the degree of similarity of the lighting device to that of a natural window or skylight may be increased, especially with regards to the appearance of the lighting device as seen by a viewer looking directly at the lighting device. The space may be defined or delimited by substantially all (the whole) of the interior surface. The first fluid and the second fluid may be immiscible. In other words, the first fluid and the second fluid may be configured such that they may not mix or blend. The density of the first fluid may be different from the density of the second fluid. The first fluid may be oil-based and the second fluid may be water-based. The first fluid and the second fluid may be configured to move within the space, which may increase the degree of similarity of the lighting device to that of a natural window or skylight.

The lighting device may for example be arranged in a wall or in a ceiling.

The lighting device may for example be arranged in a corner which separates a wall and a ceiling, thereby being arranged in both a wall and a ceiling. Further, the lighting device may comprise a longitudinal extension and a transversal extension, which is perpendicular to the longitudinal extension. The longitudinal extension of the lighting device may be larger than the transversal extension. For example, the longitudinal extension of the lighting device may be more than 10 times larger than the transversal extension of the lighting device. In other words, the lighting device may be long and thin. The lighting device may be arranged in a wall or in a ceiling from one side of a room, of the wall or the ceiling, to another side of the room. In other words, the lighting device may be arranged along the whole wall or the ceiling. Thereby, the appearance of the lighting device may become even more similar to a skylight. A person viewing the lighting device from a distance may not notice that the light emitted by the lighting device is not collimated in a direction along the longitudinal extension of the lighting device.

According to a second aspect of the present invention, a lamp, luminaire or lighting system is provided. The lamp, luminaire or lighting system comprises a lighting device according to the first aspect of the present invention.

BRIEF DESCRIPTION OF THE DRAWINGS

Exemplifying embodiments of the invention will be described below with reference to the accompanying drawings.

Figure 1:
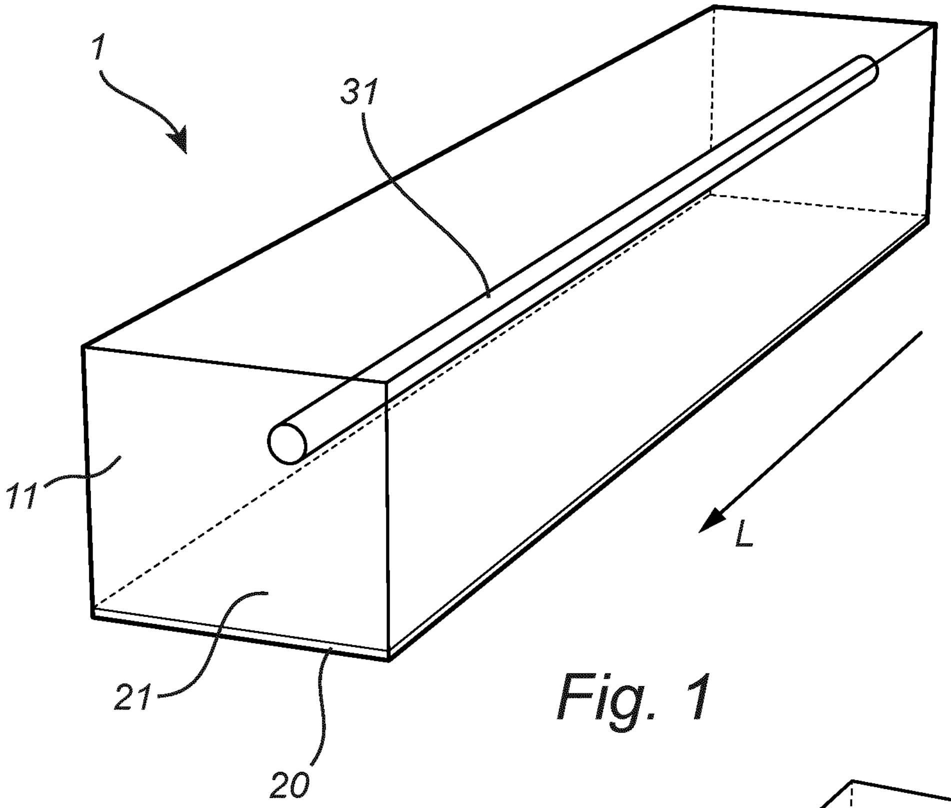
FIG. 1 is a schematic view of a lighting device according to one or more exemplifying embodiments of the present invention.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 is a schematic view of a lighting device 1 according to one or more exemplifying embodiments of the present invention. FIG. 1 shows a lighting device 1 from a perspective view. The shown lighting device 1 comprises a rectangular body, comprised by an interior surface 11 and an optical module 20. The interior surface 11 defines a cavity 10, which is extending along a longitudinal axis L of the lighting device 1. The interior surface 11 is configured to reflect light impinging upon the interior surface 11 of the cavity 10. The cavity 10 has an opening 12 permitting light inside the cavity 10 to exit the cavity 10. The opening 12 is extending along the longitudinal axis L of the lighting device 1. The interior surface 10 may be seen as three sides of the body of the lighting device 1, while the opening 12 may be seen as a fourth side of the body of the lighting device 1. The three sides of the body of the lighting device 1 comprised by the interior surface 10 may be viewed as a left side, a right side and a top side. However, the present inventive concept is not limited by the rectangular shape of the cavity 10 shown in FIG. 1. The shape of the cavity 10 may have any geometrical shape, such as for example a curved shape or shape comprising any number of sides, such as three, four, five, six, seven, eight, or more. The optical module 20 is arranged at the opening 12 of the cavity 10. The shown optical module 20 is covering the entire opening 12. However, a part of the fourth side of the body of the lighting device 1 may be comprised by the interior surface 11. The optical module 20 is configured to transmit light impinging upon a surface 21 of the optical module 20 through the optical module 20. Light transmitted through the optical module 20 is emitted from the lighting device 1. FIG. 1 shows a plurality of light emitting elements 31 arranged in a succession along the longitudinal axis L of the lighting device 1 and arranged in the cavity 10. It is to be understood that the plurality of light emitting elements 31 are schematically illustrated in FIG. 1. The plurality of light emitting elements 31 may for example comprise LEDs that are relatively densely packed (i.e. arranged with a relatively small distance between any adjacent LEDs) in the succession along the longitudinal axis L. The shown plurality of light emitting elements 31 is arranged at a distance from the middle of the cavity 10 with regards to a width of the lighting device 1. However, the plurality of light emitting elements 31 may be arranged in the middle of the cavity 10 with regards to a width of the lighting device 1. The plurality of light emitting elements 31 shown in FIG. 1 is arranged further from the surface 21 of the optical module 20 than from the interior surface 11 opposite the surface 21 of the optical module 20 (i.e. the top side of the body of the lighting device 1). The present inventive concept is not limited to the arrangement of the plurality of light emitting elements 31 as shown in FIG. 1. The plurality of light emitting elements 31 may be arranged at any position in the cavity 10 and may extend along the longitudinal axis L of the lighting device 1. Further, the plurality of light emitting elements 31 may be arranged on the surface 21, and/or on the interior surface 21 of the optical module 20. The plurality of light emitting elements 31 may be extending along the longitudinal axis L of the lighting device 1 and being arranged at an angle to the longitudinal axis L. The plurality of light emitting elements 31 are configured to emit first light 41 (not shown; see FIG. 3 and FIG. 4) impinging on the surface 21 of the optical module 20 without having first impinged on the interior surface 11 of the cavity 10, and second light 42 (not shown; see FIG. 3 and FIG. 4), impinging on the interior surface 11 of the cavity 10. The shown optical module 20 is configured to collimate the first light 41 in a transverse plane. The transverse plane is a plane which is perpendicular to the longitudinal axis L of the lighting device 1. The optical module 20 is further configured to produce collimated light so as to increase the degree of collimation of light, in the transverse plane, transmitted from the optical module 20 as compared to the first light 41 prior to transmission through the optical module 20. At least one of the interior surface 11 of the cavity 10, the plurality of light-emitting elements 31 and the optical module 20 is or are configured such that the second light 42, reflected by the interior surface 11 of the cavity 10 and subsequently having impinged upon the surface 21 of the optical module 20 and transmitted from the optical module 20, is light for which at least 3% of the total luminous flux is in the wavelength range 400-470 nm.

Figure 2:
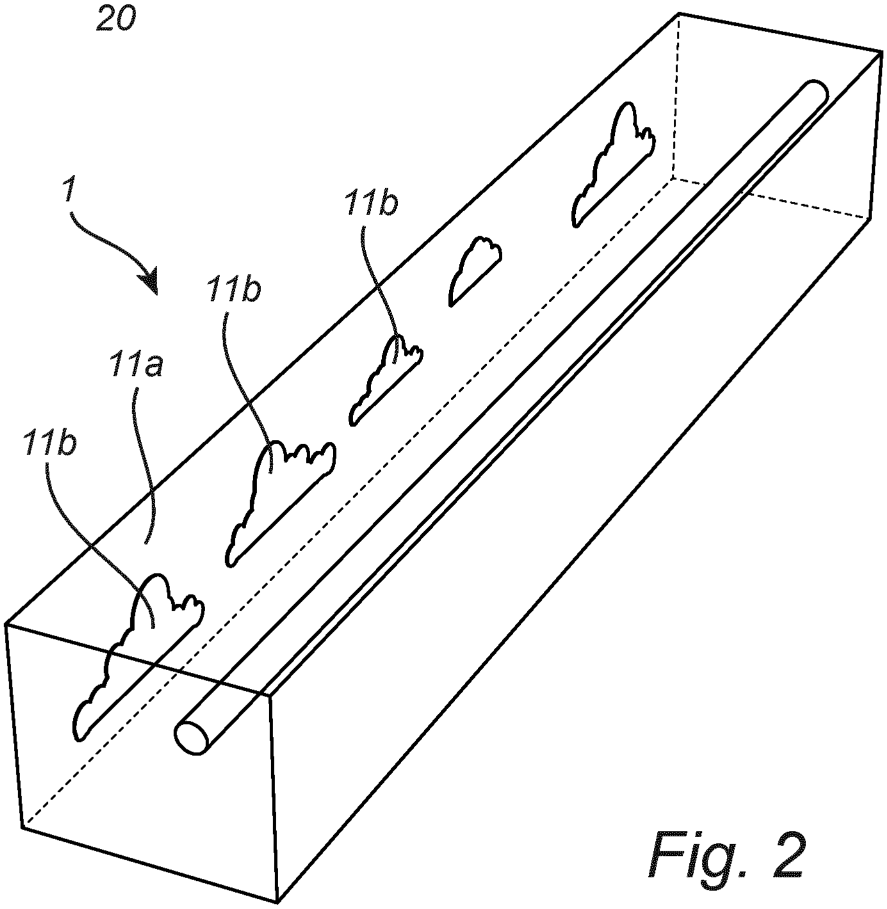
FIG. 2 is a schematic view of a lighting device according to one or more exemplifying embodiments of the present invention.

FIG. 2 is a schematic view of a lighting device 1 according to one or more exemplifying embodiments of the present invention. It should be noted that FIG. 2 comprises features, elements and/or functions as shown in FIG. 1 and described in the associated text. Hence, it is also referred to that figure and the description relating thereto for an increased understanding.

The interior surface 11 shown in FIG. 2 comprises a first interior surface 11*a* and a second interior surface 11*b*. The illustrated second interior surface 11*b* is shown a number of geometrical shapes on the interior surface 11. The second interior surface 11*b* may have any geometrical shape, such as an ellipse, a rectangle or a cloud. The second interior surface(s) 11*b* may be interspersed in the first interior surface 11*a*.

According to an exemplary embodiment, the first interior surface 11*a* is configured such that the second light 42, reflected by the first interior surface 11*a* of the cavity 10 and subsequently having impinged upon the surface 21 of the optical module 20 and transmitted through the optical module 20, is light for which at least 3% of the total luminous flux is in the wavelength range between 400-470 nm. Further, according to the exemplary embodiment the second interior surface 11*b* is configured such that the second light 42, reflected by the second interior surface 11*b* of the cavity 10 and subsequently having impinged upon the surface 21 of the optical module 20 and transmitted through the optical module 20, is light for which a percentage of the total luminous flux in the wavelength range 400-470 nm is higher than the percentage of the total luminous flux in the wavelength range 400-470 nm of the second light reflected by the first interior surface 11*a*, by the second interior surface 11*b* of the cavity having at least one of a reflectivity for light in the wavelength range 400-470 nm which is higher than a reflectivity for light in the wavelength range 400-470 nm of the first interior surface, and a reflectivity for light in the wavelength range 470-650 nm which is lower than a reflectivity for light in the wavelength range 470-650 nm of the first interior surface.

According to another exemplary embodiment, the interior surface 11 comprises a passive reflective display device, for example being constituted by or comprising an electronic ink (e-ink) display, such that second light is impinging on a surface of the passive reflective display device. In the following the example of a passive reflective display device in the form of an e-ink display will be referred to, but it is to be understood that another or other types of passive reflective display devices than an e-ink display may in alternative or in addition be employed similarly or the same to an e-ink display as described in the following. The surface of the e-ink display comprises a plurality of e-ink sections. The e-ink display comprises a control unit 50 (not shown; see FIG. 5), coupled to the e-ink display, and configured to supply a voltage to each e-ink section. An e-ink section is in a first state, if a first voltage is applied to the e-ink section by the control unit, and an e-ink section is in a second state, if a second voltage is applied to the e-ink section by the control unit. The first voltage is different from the second voltage. An e-ink section in the first state is configured such that the second light, reflected by the e-ink section in the first state and subsequently having impinged upon the surface of the optical module and transmitted through the optical module, is light for which at least 3% of the total luminous flux is in the wavelength range between 400-470 nm. An e-ink section in the second state is configured such that the second light, reflected by the e-ink section in the second state and subsequently having impinged upon the surface of the optical module and transmitted through the optical module, is light for which a percentage of the total luminous flux is in the wavelength range 400-470 nm is higher than the percentage of the total luminous flux in the wavelength range 400-470 nm of the second light reflected by the passive reflective display device section in the first state, by the e-ink section in the second state having at least one of a reflectivity for light in the wavelength range 400-470 nm which is higher than a reflectivity for light in the wavelength range 400-470 nm of the e-ink section in the first state, and a reflectivity for light in the wavelength range 470-650 nm which is lower than a reflectivity for light in the wavelength range 470-650 nm of the e-ink section in the first state. The exemplary embodiment shown in FIG. 2 comprises three clusters of e-ink sections in a first state. The three clusters of e-ink sections in a first state each comprises a geometrical shape, wherein the shape may be viewed as an ellipse shape or a cloud shape. All other e-ink sections are e-ink sections in a second state. The e-ink sections in a first state may be viewed as interspersed among the e-ink sections in a second state.

Figure 3:
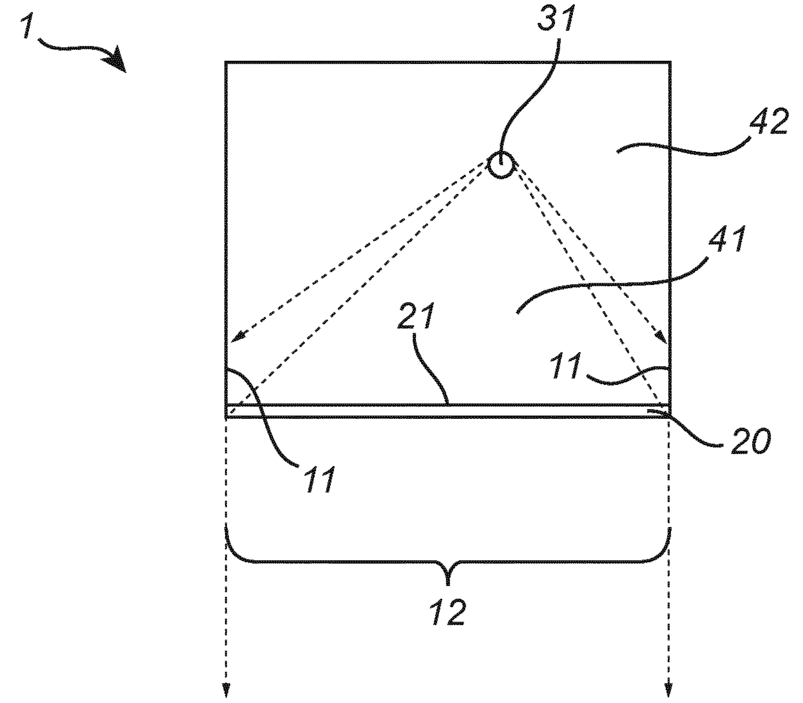
FIGS. 3-5 are schematic views of cross-sections of lighting devices perpendicular to longitudinal axes of the lighting devices according to exemplifying embodiments of the present invention.

FIG. 3 is a schematic view of a cross-section of a lighting device 1 perpendicular to a longitudinal axis of the lighting device according to exemplifying embodiments of the present invention. It should be noted that FIG. 3 comprises features, elements and/or functions as shown in FIG. 1 and described in the associated text. Hence, it is also referred to that figure and the description relating thereto for an increased understanding.

The lighting device 1 shown in FIG. 3 comprises an interior surface 11, comprising three sides. The three sides of the interior surface 11 are arranged in an upside-down U-shape (it may also be viewed as a H-shape). The two corners of the interior surfaces, which separate the three sides, are right corners. However, the corners may be rounded or curved. The interior surface 11 defines a cavity 10. The cavity 10 comprises an opening 12. The opening 12 is defined by the end of two sides of the interior surface 11. An optical module 20 is arranged at the opening 12 of the cavity 10. The optical module 20 has a surface 21 facing the cavity 10. The lighting device 1 further comprises a plurality of light emitting elements 31, arranged in relation to the cavity 10 in the same manner as illustrated in FIG. 1. The plurality of light emitting elements 31 is shown to emit first light 41. The first light is impinging on the surface 21 of the optical module 20 without having first impinged on the interior surface 11 of the cavity 10. The optical module 20 collimates the first light 41 in a transverse plane. The transverse plane being perpendicular to the longitudinal axis L (not shown; see FIG. 1) of the lighting device 1. Thereby, the optical module 20 is producing collimated light which has an increased degree of collimation of light, in the transverse plane, transmitted from the optical module 41 as compared to the first light 41 prior to transmission through the optical module 20. FIG. 3 shows the collimated first light transmitted from the optical module 20 as a defined beam. The direction of the beam in the transverse plane is exemplary, and may be any direction in the transverse plane. The direction of the beam may for example be any angle, in the transverse plane, between −90 to 90 degrees with regards to the normal of the surface, of the optical module 20, facing outward from the cavity 10 (i.e. the surface on the opposite side of the surface 21 of the optical module 20). Further, the plurality of light emitting elements 31 is shown to emit second light 42. The second light 42 is impinging on the interior surface 11 of the cavity 10. It is to be understood that the second light 42 will reflect off the interior surface 11 to impinge on either the surface 21 of the optical module 20, or to impinge again on the interior surface 11. If the second light 42 impinges on the surface 21 of the optical module 20 it will either reflect and impinge on the interior surface 11, or it will be transmitted through the optical module 20.

Figure 4:
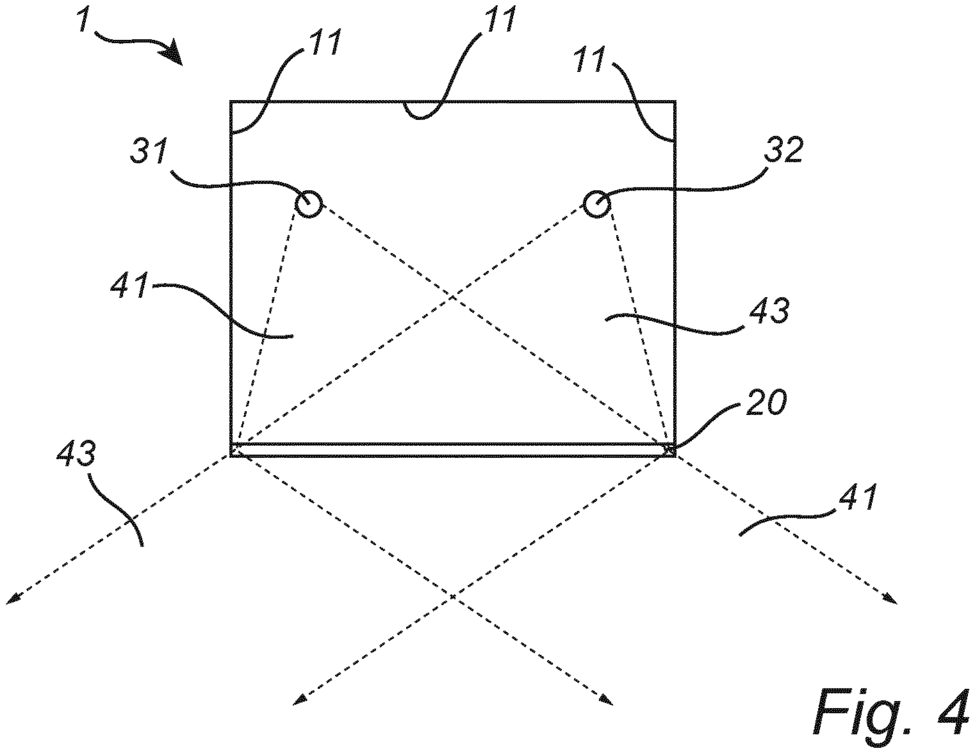

FIG. 4 is a schematic view of a cross-section of a lighting device perpendicular to a longitudinal axis of the lighting device according to exemplifying embodiments of the present invention. It should be noted that FIG. 4 comprises features, elements and/or functions as shown in FIG. 3 and described in the associated text. Hence, it is also referred to that figure and the description relating thereto for an increased understanding.

A difference between the exemplary embodiment as shown in FIG. 3 and the exemplary embodiment as shown in FIG. 4 is that the lighting device 1 shown in FIG. 4 comprises an additional plurality of light emitting elements 32. The additional plurality of light emitting elements 32 are arranged in a succession along the longitudinal axis L of the lighting device 1 and arranged in the cavity 10. The additional plurality of light emitting elements 32 emits third light 43. The third light 43 impinges on the surface 21 of the optical module 20 without having first impinged on the interior surface 11 of the cavity 10. The optical module 20 is further configured to collimate the third light 43 in the transverse plane and produce collimated light so as to increase the degree of collimation of light, in the transverse plane, transmitted from the optical module 20 as compared to the third light 43 prior to transmission through the optical module 20. At least one of the optical module 20 and the plurality of light emitting elements 32 configured to emit third light 43 is configured such that the third light 43 transmitted from the optical module 20 has a direction different from the direction of the first light 41 transmitted from the optical module 20. The arrangement of the plurality of light emitting elements 31 and of the additional plurality of light emitting elements 32 shown in FIG. 4 is exemplary. The plurality of light emitting elements 31 and the additional plurality of light emitting elements 32 may be arranged substantially anywhere within the cavity 10. For example, the additional plurality of light emitting elements 32 may be arranged between the surface 21 of the optical module 20 and the plurality of light emitting elements 31. Further, the inventive concept is not limited to one additional plurality of light emitting elements, and may comprise any number of additional plurality of light emitting elements, such as two, three, four, five, six, or more. It should be understood that the plurality of light emitting elements 31 and the additional plurality of light emitting elements 32 are configured to emit second light 42 (not shown; see FIG. 3). The second light 42 emitted by the plurality of light emitting elements 31 and the additional plurality of light emitting elements 32 is solely omitted for the purpose of providing an illustration which is easier to understand. Hence, the present inventive concept is not limited by the omission of second light in FIG. 4.

Figure 5:
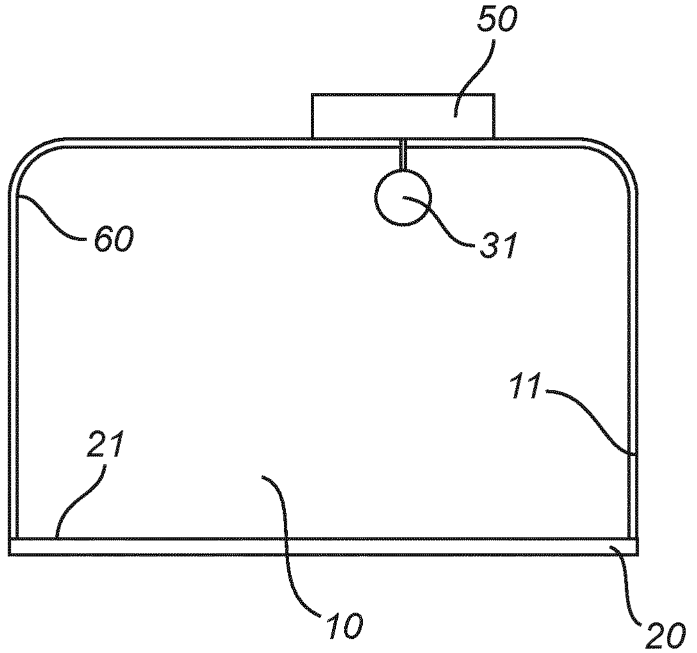

FIG. 5 is a schematic view of a cross-section of a lighting device perpendicular to a longitudinal axis of the lighting device according to exemplifying embodiments of the present invention. It should be noted that FIG. 5 comprises features, elements and/or functions as shown in FIGS. 1-4 and described in the associated text. Hence, it is also referred to that figure and the description relating thereto for an increased understanding.

A difference between the exemplary embodiment as shown in FIG. 5 and the exemplary embodiment as shown in FIGS. 3 and 4 is that the lighting device 1 as shown in FIG. 5 further comprises a control unit 50. The control unit 50 in FIG. 5 is coupled to the plurality of light emitting elements 31 via a cable. Further, the lighting device 1 shown in FIG. 5 comprises a light-transmissive layer 60. The light-transmissive layer 60 is arranged within the cavity 10 at a distance from the interior surface 11 such that the light-transmissive layer 60 and the interior surface 11 encloses a space for accommodating fluid. A first fluid and a second fluid are arranged within the space. The first fluid is configured to transmit light impinging upon the first fluid. The second fluid is configured to reflect white light impinging on the second fluid. The light-transmissive layer 60 is arranged such that the second light 42 (not shown; see FIG. 3) is impinging on at least one of the first fluid and the second fluid. The control unit 50 may comprise a pump, be coupled to the space and be configured to move the first fluid and the second within the space.

An exemplary embodiment is a lighting device 1 comprising an additional plurality of light emitting elements 32 (not shown; see FIG. 4), and a control unit 50. The control unit 50 is coupled to and configured to selectively switch on or switch off the plurality of light emitting elements 31, 32 configured to emit the first light 41 and the plurality of light emitting elements configured to emit third light 43, respectively.

In conclusion, a lighting device is provided. The lighting device comprises a cavity. The cavity is extending along a longitudinal axis of the lighting device. Further, the cavity is defined by an interior surface configured to reflect light impinging upon the interior surface of the cavity. The cavity has an opening permitting light inside the cavity to exit the cavity. The lighting device further comprises an optical module. The optical module is arranged in or at the opening of the cavity, and is configured to transmit light impinging upon a surface of the optical module through the optical module. The light transmitted through the optical module is emitted from the lighting device. The lighting device further comprises a plurality of light emitting elements. The light emitting elements are arranged in a succession along the longitudinal axis of the lighting device and arranged in the cavity, and are configured to emit first light. The first light is impinging on the surface of the optical module without having first impinged on the interior surface of the cavity. The light emitting elements are further configured to emit second light. The second light is impinging on the interior surface of the cavity. The optical module is configured to collimate the first light in a transverse plane. The transverse plane is perpendicular to the longitudinal axis of the lighting device. The optical module is further configured to produce collimated light so as to increase the degree of collimation of light, in the transverse plane, transmitted from the optical module as compared to the first light prior to transmission through the optical module. At least one of the interior surface (11) of the cavity, the plurality of light-emitting elements and the optical module is or are configured such that the second light, reflected by the interior surface of the cavity and subsequently having impinged upon the surface of the optical module and transmitted from the optical module, is light for which at least 3% of the total luminous flux is in the wavelength range 400-470 nm.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A linear lighting device having a length, a width, and a longitudinal axis, an aspect ratio of the length and width being at least 2, the linear lighting device comprising:

a cavity, extending along the longitudinal axis, the cavity being defined by an interior surface configured to reflect light impinging upon the interior surface of the cavity, the cavity having an opening permitting light inside the cavity to exit the cavity;

an optical module, arranged in or at the opening of the cavity, and configured to transmit light impinging upon a surface of the optical module through the optical module, wherein light transmitted through the optical module is emitted from the lighting device;

a plurality of light emitting elements arranged in a succession along the longitudinal axis of the lighting device and arranged in the cavity, and configured to emit first light, impinging on the surface of the optical module without having first impinged on the interior surface of the cavity, and second light, impinging on the interior surface of the cavity; and wherein the optical module comprises a linear collimator configured to collimate the first light in a transverse plane, the transverse plane being perpendicular to the longitudinal axis of the lighting device, and produce collimated light so as to increase the degree of collimation of light, in the transverse plane, transmitted from the optical module as compared to the first light prior to transmission through the optical module, wherein at least one of the plurality of light emitting elements is arranged such that the first light emitted by the plurality of light emitting elements is light for which less than 3% of the total luminous flux is in the wavelength range between 400-470 nm, and wherein at least one of the interior surface of the cavity, the plurality of light-emitting elements and the optical module is or are configured such that the second light, reflected by the interior surface of the cavity and subsequently having impinged upon the surface of the optical module and transmitted from the optical module, is light for which at least 3% of the total luminous flux is in the wavelength range 400-470 nm.

2. A linear lighting device according to claim 1, wherein at least one of the plurality of light emitting elements is arranged such that the second light emitted by the plurality of light emitting elements is light for which at least 3% of the total luminous flux is in the wavelength range between 400-470 nm.

3. A linear lighting device according to claim 1, wherein the interior surface of the cavity has a reflectivity above 80% for light in the wavelength range between 400-470 nm and a reflectivity less than 80% for light at other wavelengths.

4. A linear lighting device according to claim 3, wherein the interior surface of the cavity is configured such that the second light, reflected by the interior surface of the cavity and subsequently having impinged upon the surface of the optical module and transmitted through the optical module, is light for which at least 3% of the total luminous flux is in the wavelength range between 400-470 nm, by the interior surface of the cavity having a reflectivity above 80% for light in the wavelength range 400-470 nm and a reflectivity less than 80% for light at other wavelengths.

5. A linear lighting device according to claim 1, wherein the linear collimator is a linear lens.

6. A linear lighting device according to any of claim 1, further comprising:

a plurality of light emitting elements arranged in a succession along the longitudinal axis of the lighting device and arranged in the cavity, and configured to emit third light, impinging on the surface of the optical module without having first impinged on the interior surface of the cavity and wherein the optical module is further configured to collimate the third light in the transverse plane and produce collimated light so as to increase the degree of collimation of light, in the transverse plane, transmitted from the optical module as compared to the third light prior to transmission through the optical module; and wherein at least one of the optical module and the plurality of light emitting elements configured to emit third light is configured such that the third light transmitted from the optical module has a direction different from the direction of the first light transmitted from the optical module.

7. A linear lighting device according to claim 6, further comprising:

a control unit, coupled to and configured to selectively switch on or switch off the plurality of light emitting elements configured to emit the first light and the plurality of light emitting elements configured to emit third light, respectively.

8. A linear lighting device according to claim 1, wherein a cross section of the cavity has a rectangular shape or a curved shape.

9. A linear lighting device according to claim 1, wherein the interior surface comprises:

a first interior surface and a second interior surface;

the first interior surface being configured such that the second light, reflected by the first interior surface of the cavity and subsequently having impinged upon the surface of the optical module and transmitted through the optical module, is light for which at least 3% of the total luminous flux is in the wavelength range between 400-470 nm, and the second interior surface being configured such that the second light, reflected by the second interior surface of the cavity and subsequently having impinged upon the surface of the optical module and transmitted through the optical module, is light for which a percentage of the total luminous flux in the wavelength range 400-470 nm is higher than the percentage of the total luminous flux in the wavelength range 400-470 nm of the second light reflected by the first interior surface, by the second interior surface of the cavity having at least one of a reflectivity for light in the wavelength range 400-470 nm which is higher than a reflectivity for light in the wavelength range 400-470 nm of the first interior surface, and a reflectivity for light in the wavelength range 470-650 nm which is lower than a reflectivity for light in the wavelength range 470-650 nm of the first interior surface.

10. A linear lighting device according to claim 1, wherein the interior surface comprises a passive reflective display device, such that second light is impinging on a surface of the passive reflective display device, the surface of the passive reflective display device comprising a plurality of passive reflective display device sections, wherein the lighting device further comprises a control unit, coupled to the passive reflective display device, and configured to supply a voltage to each passive reflective display device section, wherein a passive reflective display device section is in a first state, if a first voltage is applied to the passive reflective display device section by the control unit, and a passive reflective display device section is in a second state, if a second voltage is applied to the passive reflective display device section by the control unit, wherein the first voltage is different from the second voltage, wherein a passive reflective display device section in the first state is configured such that the second light, reflected by the passive reflective display device section in the first state and subsequently having impinged upon the surface of the optical module and transmitted through the optical module, is light for which at least 3% of the total luminous flux is in the wavelength range between 400-470 nm, and wherein a passive reflective display device section in the second state is configured such that the second light, reflected by the passive reflective display device section in the second state and subsequently having impinged upon the surface of the optical module and transmitted through the optical module, is light for which a percentage of the total luminous flux is in the wavelength range 400-470 nm is higher than the percentage of the total luminous flux in the wavelength range 400-470 nm of the second light reflected by the passive reflective display device section in the first state, by the passive reflective display device section in the second state having at least one of a reflectivity for light in the wavelength range 400-470 nm which is higher than a reflectivity for light in the wavelength range 400-470 nm of the passive reflective display device section in the first state, and a reflectivity for light in the wavelength range 470-650 nm which is lower than a reflectivity for light in the wavelength range 470-650 nm of the passive reflective display device section in the first state.

11. A linear lighting device according to claim 1, further comprising:

a light-transmissive layer, arranged within the cavity at a distance from the interior surface such that the light-transmissive layer and the interior surface enclose a space for accommodating fluid; and a first fluid and a second fluid arranged within the space, the first fluid and the second fluid having different optical properties with regard to at least one or more of reflectance, absorbance, transmittance or scattering of light impinging on the first fluid and the second fluid, respectively;

wherein the light-transmissive layer is arranged such that the second light is impinging on at least one of the first fluid and the second fluid.

12. A linear lighting device according to claim 1, wherein the lighting device is arranged in a wall or in a ceiling.

13. A lamp, luminaire or lighting system comprising a linear lighting device according to claim 1.

* * * * *